United States Patent
Schnebele

(10) Patent No.: US 9,618,050 B2
(45) Date of Patent: Apr. 11, 2017

(54) DRIVE PINION FASTENING ASSEMBLY

(71) Applicant: Dana Automotive Systems Group, LLC, Maumee, OH (US)

(72) Inventor: Jens Schnebele, Petersburg, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 644 days.

(21) Appl. No.: 14/053,768

(22) Filed: Oct. 15, 2013

(65) Prior Publication Data

US 2014/0105680 A1    Apr. 17, 2014

Related U.S. Application Data

(60) Provisional application No. 61/713,911, filed on Oct. 15, 2012.

(51) Int. Cl.
| | |
|---|---|
| *F16C 35/063* | (2006.01) |
| *F16H 48/42* | (2012.01) |
| *F16D 1/04* | (2006.01) |
| *B60K 17/16* | (2006.01) |
| *F16H 57/037* | (2012.01) |

(52) U.S. Cl.
CPC ............... *F16D 1/04* (2013.01); *B60K 17/16* (2013.01); *F16C 35/063* (2013.01); *F16C 2361/61* (2013.01); *F16H 57/037* (2013.01); *F16H 2048/423* (2013.01); *Y10T 403/7033* (2015.01)

(58) Field of Classification Search
CPC ...... B60K 17/16; F16C 33/586; F16C 35/063; F16C 2361/61; F16D 1/04; F16H 48/42; F16H 57/037; F16H 2048/423; F16H 2048/426; Y10T 403/3986; Y10T 403/56; Y10T 403/7033; Y10T 403/7047

USPC ...... 403/200, 299, 359.5, 365; 464/178, 182
See application file for complete search history.

(56) References Cited

U.S. PATENT DOCUMENTS

| | | | | |
|---|---|---|---|---|
| 2,031,584 | A | | 2/1936 | Austin |
| 3,323,844 | A | | 6/1967 | Hedstrom |
| 3,449,926 | A | * | 6/1969 | Hawkins ............. F01D 5/026 403/359.5 |
| 3,622,185 | A | * | 11/1971 | Rosan, Sr. ............ F16D 1/06 403/259 |
| 6,749,386 | B2 | * | 6/2004 | Harris .................. F16B 39/24 411/150 |
| 6,761,237 | B2 | * | 7/2004 | Brissette ............. F16D 1/0864 180/24.12 |
| 6,780,114 | B2 | * | 8/2004 | Sahashi ............... B60B 27/00 464/146 |
| 6,857,835 | B2 | * | 2/2005 | Wang .................. B60B 27/00 403/359.5 |

(Continued)

FOREIGN PATENT DOCUMENTS

| | | |
|---|---|---|
| DE | 10043799 A1 | 3/2002 |
| EP | 1602519 A1 | 12/2005 |

*Primary Examiner* — Josh Skroupa
(74) *Attorney, Agent, or Firm* — Marshall & Melhorn, LLC

(57) ABSTRACT

A drive pinion fastening assembly including a drive pinion, a pinion sleeve, an external spline, and a pinion fastener. The pinion sleeve is disposed on and engaged with the drive pinion. The external spline is formed on one of the drive pinion and the pinion sleeve for engaging the power transmission component. The pinion fastener is disposed on and engaged with the drive pinion. The pinion fastener militates against axial movement of the pinion sleeve with respect to the drive pinion.

9 Claims, 2 Drawing Sheets

(56) References Cited

U.S. PATENT DOCUMENTS

| | | | | |
|---|---|---|---|---|
| 6,976,816 B2 * | 12/2005 | Slesinski | ............... | F16B 39/103 411/120 |
| 8,136,997 B2 * | 3/2012 | Rivett | ..................... | F16C 19/54 384/519 |
| 8,231,298 B2 * | 7/2012 | Szentmihalyi | .......... | F16D 1/116 403/359.5 |
| 2010/0267455 A1 * | 10/2010 | Valovick | ............... | F16D 1/0858 464/142 |

* cited by examiner

DRIVE PINION FASTENING ASSEMBLY

CLAIM OF PRIORITY

The present application claims the benefit of priority to U.S. Provisional Application No. 61/713,911 filed on Oct. 15, 2012, which is incorporated herein in its entirety by reference.

FIELD OF THE INVENTION

The present invention relates to drivelines for vehicles and more particularly to a fastening assembly for a drive pinion.

BACKGROUND OF THE INVENTION

Conventionally, drive pinions used with axle assemblies have been drivingly engaged with other components of a drivetrain of a vehicle using a companion flange. The companion flange is a hollow annular body which has a substantially "L" shaped cross-section. The companion flange typically provides a location for securing a portion of a universal joint thereto; however, other components of a drivetrain may be coupled thereto. An outermost portion of the companion flange usually includes a plurality of apertures formed therein, which receive threaded fasteners to secure a component to the companion flange.

The companion flange, however, has limitations that restrict its use in certain applications. A design of the companion flange can become excessive in size as a torque requirement of a drivetrain increases. Ease of manufacturability of the companion flange can be decreased in certain applications. Further, assembly of the drivetrain including the companion flange may be time consuming. Consequently, selecting the companion flange as a drivetrain component may become costly and problematic.

It would be advantageous to develop a fastening assembly for a drive pinion that is compact, able to handle increased torque loads, and is easy to manufacture.

SUMMARY OF THE INVENTION

Presently provided by the invention, a fastening assembly for a drive pinion that is compact, able to handle increased torque loads, and is easy to manufacture, has surprisingly been discovered.

In one embodiment, the present invention is directed to a drive pinion fastening assembly. The drive pinion fastening assembly comprises a drive pinion, a pinion sleeve, an external sleeve, and a pinion fastener. The pinion sleeve is disposed on and engaged with the drive pinion. The external spline is formed on one of the drive pinion and the pinion sleeve for engaging a power transmission component. The pinion fastener is disposed on and engaged with the drive pinion. The pinion fastener militates against axial movement of the pinion sleeve with respect to the drive pinion.

In another embodiment, the present invention is directed to a drive pinion fastening assembly. The drive pinion fastening assembly comprises a drive pinion, a pinion sleeve, an external spline, and a pinion fastener. The drive pinion includes a locking spline portion. The pinion sleeve is disposed on and engaged with the drive pinion. The external spline is formed on the drive pinion for engaging a power transmission component. The pinion fastener is disposed on and engaged with the locking spline portion of the drive pinion through an interference fit. The pinion fastener militates against axial movement of the pinion sleeve with respect to the drive pinion.

In yet another embodiment, the present invention is directed to a drive pinion fastening assembly. The drive pinion fastening assembly comprises a drive pinion, a pinion sleeve, an external spline, and a pinion fastener. The drive pinion includes a splined portion. The pinion sleeve includes an inner splined portion for engaging the splined portion of the drive pinion. The pinion sleeve is disposed on and engaged with the drive pinion. The external spline is formed on the pinion sleeve and engages a power transmission component. The pinion fastener includes a thread formed on an inner surface thereof. The pinion fastener is disposed on and threadingly engaged with the drive pinion. The pinion fastener militates against axial movement of the pinion sleeve with respect to the drive pinion.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
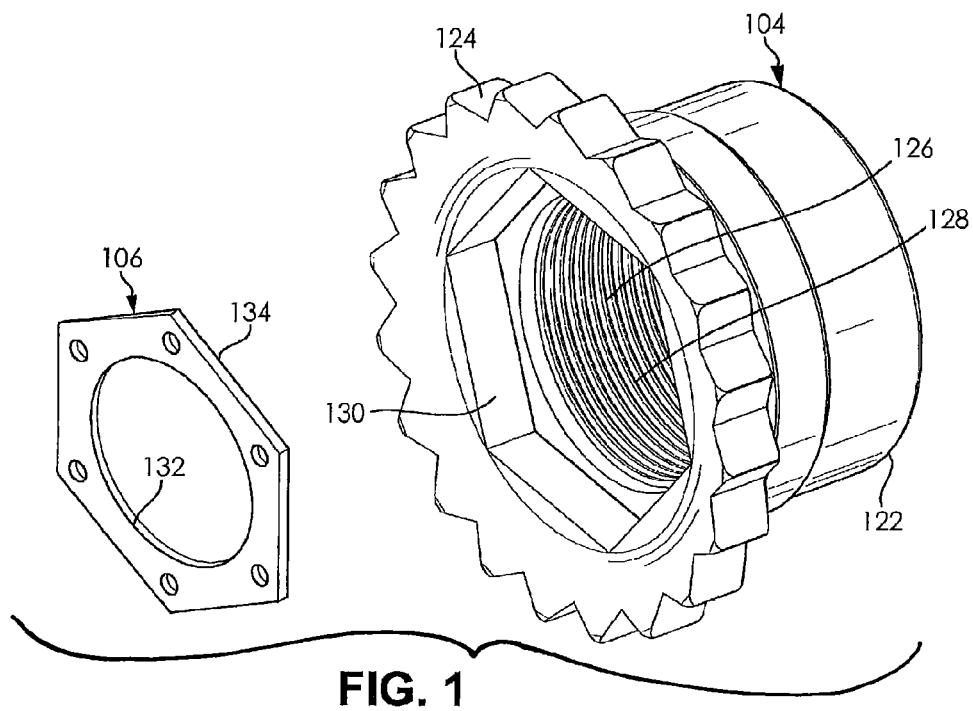
FIG. 1 is a perspective view of a pinion sleeve and a pinion fastener of a pinion fastening assembly according to an embodiment of the present invention.
Figure 2:
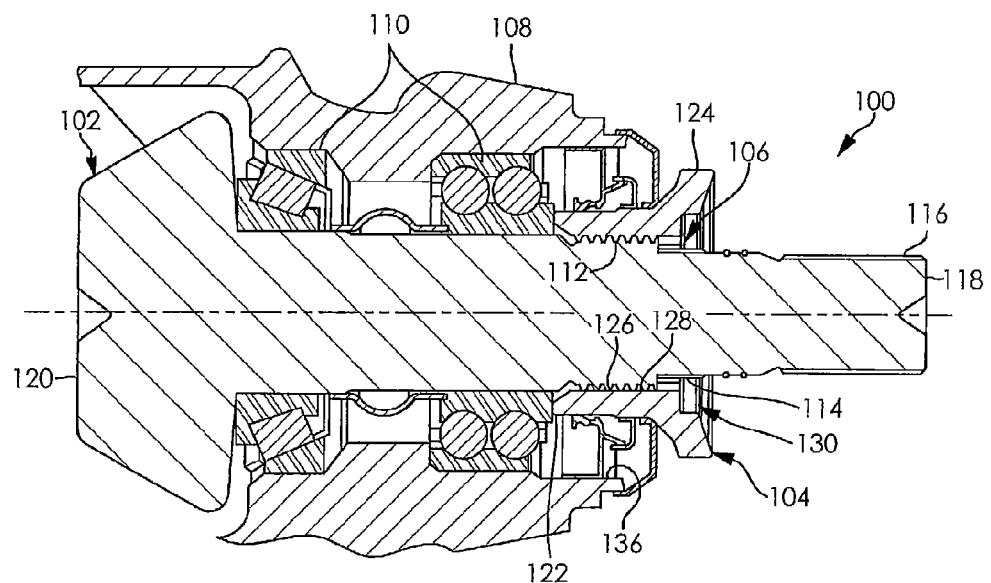
FIG. 2 is a cross sectional view of a pinion fastening assembly according to an embodiment including the pinion sleeve and the pinion fastener illustrated in FIG. 1.

FIGS. 1 and 2 illustrate a drive pinion fastening assembly 100 according to an embodiment of the present invention. The drive pinion fastening assembly 100 includes a drive pinion 102, a pinion sleeve 104, and a pinion fastener 106. The pinion sleeve 104 is disposed on the drive pinion 102 and is threadingly engaged with the drive pinion 102. The pinion fastener 106 is disposed in the pinion sleeve 104 and is in engagement with the pinion sleeve 104 and the drive pinion 102.

FIG. 2 illustrates the drive pinion 102. The drive pinion 102 is an elongate member rotatably disposed in a housing 108. It is understood that the drive pinion 102 and the housing 108 may be used with a front axle drive assembly (not shown) or a rear axle drive assembly (not shown). The drive pinion 102 is formed by machining and heat treating a metal such as steel. A pair of bearings 110 is disposed between the drive pinion 102 and the housing 108, to facilitate rotation of the drive pinion 102 therein. The drive pinion 102 includes a threaded portion 112, a locking spline portion 114, and an engagement spline portion 116.

The threaded portion 112 of the drive pinion 102 is formed on an outer surface of the drive pinion 102 adjacent the locking spline portion 114, intermediate a first end 118 and a second end 120 of the drive pinion 102. When the pinion sleeve 104 is disposed on the drive pinion 102, the pinion sleeve 104 may be threadingly engaged with the threaded portion 112.

The locking spline portion 114 of the drive pinion 102 is formed on an outer surface of the drive pinion 102 between the threaded portion 112 and the engagement spline portion 116. The locking spline portion 114 engages the pinion fastener 106 when the pinion fastener 106 is disposed thereon. The locking spline portion 114 comprises a plurality of splines in an annular arrangement; however, it is understood that the locking spline portion 114 may comprise other features for engaging the pinion fastener 106. A diameter of the locking spline portion 114 is less than a diameter of the threaded portion 112.

The engagement spline portion 116 of the drive pinion 102 is formed adjacent an end thereof. When the drive pinion 102 is disposed in the housing 108, the end including the engagement spline portion 116 extends therefrom. The engagement spline portion 116 comprises a plurality of splines formed on the outer surface of the drive pinion 102 in an annular arrangement. A diameter of the engagement spline portion 116 is less than a diameter of the threaded portion 112 and the locking spline portion 114; however, it is understood that the diameter of the engagement spline portion 116 may be substantially equal to the diameter of the locking spline portion 114. The engagement spline portion 116 engages a power transmission component (not shown), such as a universal joint.

The pinion sleeve 104 is a hollow annular body having a first end 122 and a second end 124. As shown in FIGS. 1 and 2, the second end 124 has a diameter greater than a diameter of the first end 122; however, it is understood that the first end 122 and the second end 124 of the pinion sleeve 104 may have other sizes and shapes. At least a portion of an inner surface 126 of the pinion sleeve 104 has a thread 128 formed thereon corresponding to the threaded portion 112 of the drive pinion 102. A fastening recess 130 is formed in the second end 124 of the pinion sleeve 104.

When the drive pinion fastening assembly 100 is assembled, the first end 122 of the pinion sleeve 104 abuts one of the bearings 110 and applies a force thereto to secure the drive pinion 102 within the housing 108.

The second end 124 of the pinion sleeve 104 extends radially outwardly from a remaining portion of the pinion sleeve 104. As shown in FIG. 1, the second end 124 is shaped to facilitate engagement with a fastening tool (not shown); however, it is understood that the second end 124 may be shaped in any manner that facilitates rotation of the pinion sleeve 104. The fastening recess 130 is hexagonal in shape and substantially corresponds to a shape of the pinion fastener 106; however, it is understood that other shapes may be used.

The pinion fastener 106 is a member formed from a metal. The pinion fastener 106 may be formed by stamping a sheet metal, coining a workpiece, or any other suitable process. The pinion fastener 106 is disposed in the fastening recess 130, about the drive pinion 102, and is in driving engagement with the drive pinion 102 when the drive pinion fastening assembly 100 is assembled. The pinion fastener 106 has an inner peripheral edge 132 and an outer peripheral edge 134. The inner peripheral edge 132 defines a circular perforation through the pinion fastener 106 and has a diameter greater than the diameter of the engagement spline portion 116 and less than the diameter of the locking spline portion 114. The outer peripheral edge 134 is substantially hexagonal in shape and substantially corresponds to a shape of the fastening recess 130; however, it is understood other shapes may be used.

In use, the drive pinion fastening assembly 100 facilitates securing the drive pinion 102 within the housing 108 in a manner that isolates the pinion sleeve 104 and the pinion fastener 106 from torque applied to drive pinion 102. Torque is applied directly to the drive pinion 102 through the engagement spline portion 116, and thus the pinion sleeve 104 and the pinion fastener 106 are isolated from torque applied to drive pinion 102.

When the drive pinion fastening assembly 100 is assembled, the drive pinion 102 is disposed through the pair of bearings 110 and the first end 118 of the drive pinion 102 including the engagement spline portion 116 extends from a perforation 136 formed in the housing 108. Next, the pinion sleeve 104 is disposed on the drive pinion 102 and the thread 128 is engaged with the threaded portion 112. The pinion sleeve 104 is rotated until the first end 122 contacts one of the bearings 110 and a predetermined level of torque or rotation angle is applied thereto, which secures the drive pinion 102 and the bearings 110. Next, the pinion fastener 106 is entirely disposed in the fastening recess 130, with the inner peripheral edge 132 disposed against, but not engaged with, the locking spline portion 114.

To secure the pinion fastener 106 to the locking spline portion 114, a press (not shown) or other tool is disposed against the pinion fastener 106 and a force is applied thereto in a direction of the pinion sleeve 104. The inner peripheral edge 132 deforms as a result of the force being applied by the press, and the pinion fastener 106 becomes engaged with both the locking spline portion 114 and the pinion sleeve 104. The pinion fastener 106 is engaged with the locking spline portion 114 through an interference fit and the pinion fastener 106 is engaged with the pinion sleeve 104 because the outer peripheral edge 134 is disposed within the fastening recess 130. Such an arrangement militates against rotation of the pinion sleeve 104 and therefore prevents the pinion sleeve 104 from becoming unfastened as the pinion sleeve 104 is in driving engagement with the pinion fastener 106.

Figure 3:
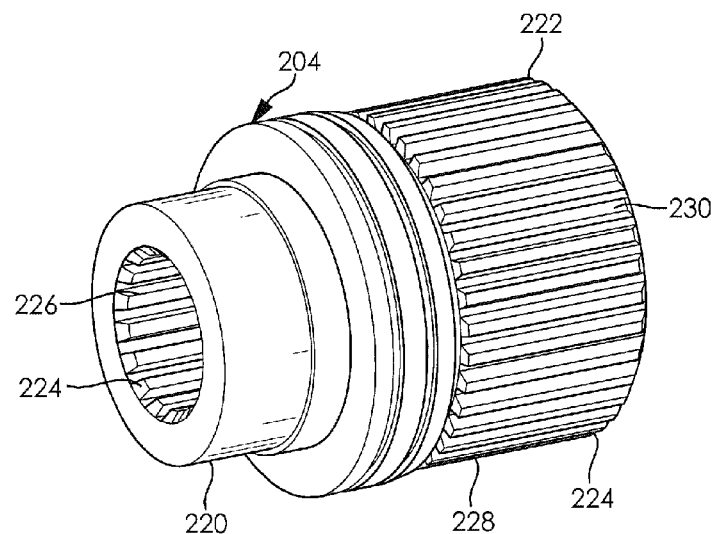
FIG. 3 is a perspective view of a pinion sleeve of a pinion fastening assembly according to another embodiment of the present invention.
Figure 4:
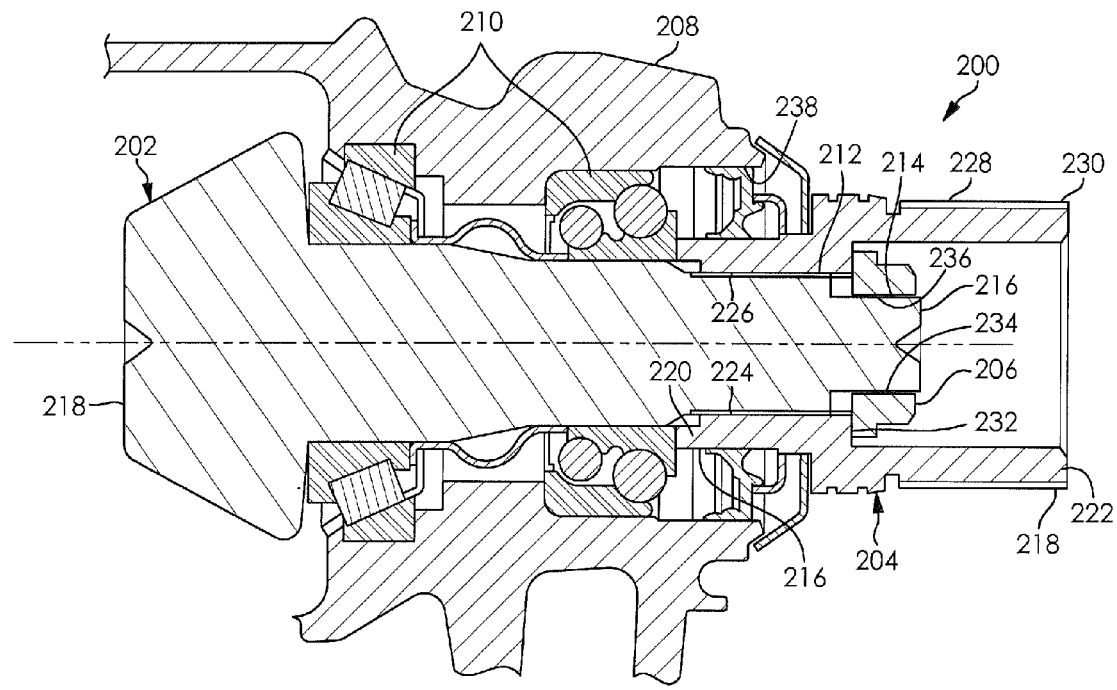
FIG. 4 is a cross sectional view of a pinion fastening assembly according to an embodiment including the pinion sleeve and the pinion fastener illustrated in FIG. 3.

FIGS. 3 and 4 illustrate a drive pinion fastening assembly 200 according to another embodiment of the present invention. The drive pinion fastening assembly 200 includes a drive pinion 202, a pinion sleeve 204, and a pinion fastener 206. The pinion sleeve 204 is disposed on the drive pinion 202 and is splinesly engaged with the drive pinion 202. The pinion fastener 206 is entirely disposed in the pinion sleeve 204 and is threadingly engaged with the drive pinion 202.

FIG. 4 illustrates the drive pinion 202. The drive pinion 202 is an elongate member rotatably disposed in a housing 208. It is understood that the drive pinion 202 and the housing 208 may be used with a front axle drive assembly (not shown) or a rear axle drive assembly (not shown). The drive pinion 202 is formed by machining and heat treating a metal such as steel. A pair of bearings 210 is disposed between the drive pinion 202 and the housing 208, to facilitate rotation of the drive pinion 202 therein. The drive pinion 202 includes a splined portion 212 and a threaded portion 214 formed thereon.

The splined portion 212 of the drive pinion 202 is formed on an outer surface thereof adjacent the threaded portion 214, intermediate a first end 216 and a second end 218 of the drive pinion 202. When the pinion sleeve 204 is disposed on the drive pinion 202, the pinion sleeve 204 may be splinningly engaged with the splined portion 212.

The threaded portion 214 of the drive pinion 202 is formed on an outer surface of the drive pinion 202 adjacent the splined portion 212. When the pinion fastener 206 is disposed on the threaded portion 214, the pinion fastener 206 may be threadingly engaged with the threaded portion 214. When the drive pinion 202 is disposed in the housing 208, the end including the threaded portion 214 extends therefrom. A diameter of the threaded portion 214 is less than a diameter of the splined portion 212.

The pinion sleeve 204 is a hollow annular body having a first end 220 and a second end 222. The second end 222 has a diameter greater than the first end 220; however, it is understood that the first end 220 and the second end 222 may have other shapes and sizes. At least a portion of an inner surface 224 of the first end 220 has an inner splined portion 226 formed thereon corresponding to the splined portion 212 of the drive pinion 202. When the drive pinion fastening assembly 200 is assembled, the inner splined portion 226 of the pinion sleeve 204 is in driving engagement with the splined portion 212 of the drive pinion 202. At least a portion of an outer surface 228 of the second end 222 defines an outer splined portion 230 formed thereon. The outer splined portion 230 engages a power transmission component (not shown), such as a universal joint. A portion of the first end 220 defines a fastening flange 232 in the pinion sleeve 204. The fastening flange 232 extends radially outwardly from the first end 220 of the pinion sleeve 204. When the drive pinion fastening assembly 200 is assembled, the first end 220 of the pinion sleeve 204 abuts one of the bearings 210 and applies a force thereto to secure the drive pinion 202 within the housing 208.

The pinion fastener 206 is a threaded fastener formed from a metal using any conventional process. The pinion fastener 206 is a conventional, hexagonally shaped, flanged nut; however, it is understood that the pinion fastener 206 may be another type of fastener and have another shape. The pinion fastener 206 is disposed within the pinion sleeve 204, about the first end 216 of the drive pinion 202, and is threadingly engaged with the threaded portion 214 of the drive pinion 202 when the drive pinion fastening assembly 200 is assembled. A thread 234 formed on an inner surface 236 of the pinion fastener 206 is engaged with the threaded portion 214 of the drive pinion 202. When the drive pinion fastening assembly 200 is assembled, the pinion fastener 206 may be secured to the drive pinion 202 using a thread adhesive (not shown).

In use, the drive pinion fastening assembly 200 facilitates securing the drive pinion 202 within the housing 208 in a manner that isolates the pinion fastener 206 from torque applied to drive pinion 202. Torque is applied to the drive pinion 202 through the pinion sleeve 204. The outer splined portion 230 of the pinion sleeve 204 is in engagement with the power transmission component, and torque is then transferred to the drive pinion 202 through the engagement of the inner splined portion 226 and the splined portion 212. Accordingly, the pinion fastener 206 is isolated from torque applied to drive pinion 202.

When the drive pinion fastening assembly 200 is assembled, the drive pinion 202 is disposed through the pair of bearings 210 and the end of the drive pinion 202 including the threaded portion 214 extends from a perforation 238 formed in the housing 208. Next, the pinion sleeve 204 is disposed on the drive pinion 202 and the inner splined portion 226 is engaged with the spline portion 212. Next, the pinion fastener 206 is disposed within the second end 218 of the pinion sleeve 204.

To secure the pinion fastener 206 to the drive pinion 202, the thread 234 of the pinion fastener 206 is then engaged with the threaded portion 214 of the drive pinion 202. The pinion fastener 206 is rotated until a predetermined level of torque or angle of rotation is reached, which secures the drive pinion 202 and the bearings 210 within the housing 208, and the pinion sleeve 204 to the drive pinion 202. Such an arrangement militates against rotation of the pinion fastener 206 as a torque applied to the drive pinion 202 passes through the pinion sleeve 204 and therefore prevents the pinion fastener 206 from becoming unfastened as the pinion sleeve 204 is in driving engagement with the drive pinion 202.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A drive pinion fastening assembly, comprising:
   a drive pinion;
   a pinion sleeve having a first end and a second end is disposed on and engaged with the drive pinion;
   wherein the second end of the pinion sleeve has a fastening recess formed in the second end of the pinion sleeve;
   an external spline formed on the drive pinion for engaging a power transmission component; and
   a pinion fastener having an inner peripheral edge and an outer peripheral edge, wherein the inner peripheral edge of the pinion fastener is disposed on and engaged with the drive pinion through an interference fit, wherein the pinion fastener is entirely disposed within the fastening recess on the second end of the pinion sleeve, wherein the pinion fastener militates against axial movement of the pinion sleeve with respect to the drive pinion.

2. The drive pinion fastening assembly according to claim 1, wherein the external spline is formed on the drive pinion.

3. The drive pinion fastening assembly according to claim 2, wherein the drive pinion further includes a threaded portion and the pinion sleeve includes a thread formed thereon for engaging the threaded portion of the drive pinion.

4. The drive pinion fastening assembly according to claim 2, wherein the drive pinion further includes a locking spline portion for engaging the pinion fastener.

5. The drive pinion fastening assembly according to claim 4, wherein a diameter of the external spline is less than a diameter of the locking spline portion.

6. The drive pinion fastening assembly according to claim 1, wherein the pinion fastener is drivingly engaged with the pinion sleeve.

7. A drive pinion fastening assembly, comprising:
   a drive pinion including a locking spline portion;
   a pinion sleeve having a first end and a second end is disposed on and engaged with the drive pinion;

wherein the second end of the pinion sleeve has a fastening recess formed in the second end of the pinion sleeve;

an external spline formed on the drive pinion for engaging a power transmission component; and a pinion fastener having an inner peripheral edge and an outer peripheral edge, wherein the inner peripheral edge of the pinion fastener is disposed on and engaged with the locking spline portion of the drive pinion through an interference fit, wherein the pinion fastener is entirely disposed within the fastening recess on the second end of the pinion sleeve, wherein the pinion fastener militates against axial movement of the pinion sleeve with respect to the drive pinion.

8. The drive pinion fastening assembly according to claim 7, wherein the drive pinion further includes a threaded portion and the pinion sleeve includes a thread formed thereon for engaging the threaded portion of the drive pinion.

9. The drive pinion fastening assembly according to claim 7, wherein a diameter of the external spline is less than a diameter of the locking spline portion.

\* \* \* \* \*